United States Patent
Uzawa et al.

(10) Patent No.: US 11,711,303 B2
(45) Date of Patent: Jul. 25, 2023

(54) COMMUNICATION CONTROL SYSTEM, COMMUNICATION CONTROL METHOD, COMMUNICATION CONTROL APPARATUS AND COMMUNICATION CONTROL PROGRAM

(71) Applicant: NIPPON TELEGRAPH AND TELEPHONE CORPORATION, Tokyo (JP)

(72) Inventors: Hiroyuki Uzawa, Musashino (JP); Naotaka Shibata, Musashino (JP); Yoichi Fukada, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 56 days.

(21) Appl. No.: 17/595,063

(22) PCT Filed: Apr. 27, 2020

(86) PCT No.: PCT/JP2020/017947
§ 371 (c)(1),
(2) Date: Nov. 8, 2021

(87) PCT Pub. No.: WO2020/230609
PCT Pub. Date: Nov. 19, 2020

(65) Prior Publication Data
US 2022/0200911 A1 Jun. 23, 2022

(30) Foreign Application Priority Data
May 10, 2019 (JP) ................................ 2019-090105

(51) Int. Cl.
| | | |
|---|---|---|
| H04L 47/22 | (2022.01) | |
| H04L 47/32 | (2022.01) | |
| H04L 49/351 | (2022.01) | |

(52) U.S. Cl.
CPC ............ H04L 47/225 (2013.01); H04L 47/32 (2013.01); H04L 49/351 (2013.01)

(58) Field of Classification Search
CPC ...... H04L 47/225; H04L 47/32; H04L 49/351
See application file for complete search history.

(56) References Cited

PUBLICATIONS

Uzawa,Hiroyuki, "Layer-2 Network Control Techniques for Multiservice Accommodation toward 5G/IoT era","3.IoT traffic control technology"to "3.2.1.Shapingtechnology that cooperates between SW", Research Institute of Electrical Communication), Aug. 2018 (Year: 2018).*

(Continued)

*Primary Examiner* — Siming Liu
(74) *Attorney, Agent, or Firm* — Harness, Dickey & Pierce, P.L.C.

(57) ABSTRACT

A communication control system includes a plurality of layer 2 switches (SWs); and a communication control device that controls communication of the SWs. Each SW includes one or more queues that each have a variable queue length for accumulating input frames, and a transmission unit that has a shaping function of transmitting the frames accumulated in the queues to a desired destination at a desired rate. The communication control device includes a correction processing unit that acquires an amount of discarded data generated in each queue of the SW, and multiplies the acquired amount of discarded data by a correction coefficient weighted by the cumulative number of times of discarding occurrences for which the amount of discarded data is not 0 to obtain a corrected amount of discarded data; and an adjustment processing unit that determines adjustment values for the queue length of each queue and shaping rate (Continued)

of the SW based on the corrected amount of discarded data, and notifies each SW of the adjustment values.

8 Claims, 7 Drawing Sheets

(56) References Cited

PUBLICATIONS

Kenji Anzai et al., Development of 10 Gbits/s Traffic Shaper PureFlow GSX-XR, Anritsu Technical, 2013, No. 88, pp. 46-52.
Hiroyuki Uzawa et al., Layer-2 Network Control Techniques for Multi-service Accommodation toward 5G/IoT era, IEICE Technical Report, vol. 118, No. 208, 2018.

* cited by examiner (a)

(b)

COMMUNICATION CONTROL SYSTEM, COMMUNICATION CONTROL METHOD, COMMUNICATION CONTROL APPARATUS AND COMMUNICATION CONTROL PROGRAM

CROSS-REFERENCE TO RELATED APPLICATIONS

This application is a 371 U.S. National Phase of International Application No. PCT/JP2020/017947 filed on Apr. 27, 2020, which claims priority to Japanese Application No. 2019-090105 filed on May 10, 2019. The entire disclosures of the above applications are incorporated herein by reference.

TECHNICAL FIELD

The present invention relates to a communication control system, a communication control method, a communication control device, and a communication control program for leveling microbursts generated in a layer 2 network (L2NW) including a layer 2 switch (SW).

BACKGROUND ART

Communication terminals for IoT (Internet of Thing) (hereinafter referred to as IoT terminals) are arranged in various places depending on the purpose. These IoT terminals are connected to a server (hereinafter referred to as an IoT server) via a radio base station or dedicated gateway device (hereinafter referred to as an IoT-GW), and data is transmitted and received in accordance with instructions from the IoT server.

FIG. 6 illustrates a configuration example of a conventional communication control system.

In FIG. 6, each IoT terminal is connected to an IoT-GW by wireless communication or wired communication. Each IoT-GW performs bidirectional communication with an IoT server via a layer 2 network (L2NW) including layer 2 switches (SWs).

In the L2NW, a connection path for exclusive communication is formed in advance among IoT-GW #1, IoT-GW #2, and IoT server #1. In FIG. 6, the identifier (flow ID) of the path is set to 100. Data from IoT-GW #1 is assigned at least a flow ID of 100 at SW #0, which is the entrance of the L2NW, and is transferred to the next SW to which the date is to be transferred in accordance with a transfer routing table. Here, the transfer routing table describes a transfer routing path for each flow ID.

In this L2NW transfer, a plurality of IoT-GWs may be accommodated in the same flow ID. Therefore, for example, when pieces of data for connection requests from a plurality of IoT terminals to the same IoT server are simultaneously generated on the same flow ID, the pieces of data are subjected to time multiplexing on the L2NW, and reaches the IoT server in the form of a microburst, which is a burst of traffic in a short period of time in milliseconds. As a result, the input traffic to the IoT server momentarily exceeds the processing speed, so that data is discarded, and it is necessary to resend the data from the IoT terminal.

In order to prevent this issue, it is necessary to reduce (level) the microburst to the maximum processing speed or less of the IoT server and input it to the IoT server (NPL 1). However, since it is difficult to know in advance which SW the microburst originates from, it is necessary for each SW to have a large-capacity buffer for microburst leveling, which increases the construction cost of the L2NW.

Therefore, NPL 2 discloses a method of pooling, as a resource that can be allocated, a memory for buffer originally mounted on each SW in a group of SWs on a transfer path, and adjusting the resource allocation amount of the pooled memories according to a generated microburst, so that it is possible to level the microburst up to a target rate (maximum processing rate of the IoT server) without increasing the size of the buffer memory mounted on each SW.

FIG. 7 illustrates an example of changing the resource allocation amount disclosed in NPL 2.

In FIG. 7, each SW in the L2NW includes the same number of queues as the number of flow IDs, and accumulates transfer frames for each flow ID. Each SW also includes a transmission unit having a shaping function (shaper) for leveling the accumulated frames to a designated shaping rate for each flow ID and outputting the resulting frames. In FIG. 7, (a) illustrates an example before the resource allocation amount is changed, and in FIG. 7, (b) illustrates an example after the resource allocation amount is changed.

As illustrated in (a) of FIG. 7, the required value of the input rate to the IoT server is set to 1 Gbps, and the initial value of the leveling rate of each of SW #0, SW #1, and SW #2 for the flow is also set to 1 Gbps. Further, the initial value of the queue length of each SW for the flow is set to 1 Mbit, and the input traffic to SW #0 is a microburst in which 5 Gbps continues for 1 ms. When the microburst occurs, the required amount of accumulated data of SW #0 is (Input 5 Gbps−Output 1 Gbps)×Burst Length 1 ms=4 Mbit.

However, since the queue length of SW #0 is 1 Mbit, queue overflow occurs, so that data of 3 Mbit is discarded. On the other hand, in SW #1 and SW #2, since the input/output rate is 1 Gbps, data of 1 Mbit is sequentially transferred, so that data is not discarded.

In order to prevent the recurrence of discarding at SW #0, in the method according to NPL 2, the resource allocation amount is adjusted so that the discarded data is distributed and buffered in the queues of the SWs on the transfer path, as illustrated in (b) of FIG. 7. Specifically, the queue length of SW #0 is set to 2 Mbit by being increased by 1 Mbit so that the discarded data amount of 3 Mbit is distributed and buffered in three SWs on the transfer path by 1 Mbit, and the shaping rate of SW #0 is set to 3 Gbps so that queue overflow does not occur. As a result, the amount of accumulated data of SW #0 is (Input 5 Gbps−Output 3 Gbps)×Burst Length 1 ms=2 Mbit.

In SW #1 in the next stage, it already has a queue length of 1 Mbit, the queue length is not changed, and the shaping rate is set to 2 Gbps to reduce the amount of data to be buffered in the queue to 1 Mbit or less. As a result, the amount of accumulated data of SW #1 is (Input 3 Gbps−Output 2 Gbps)×Burst Length 1 ms=1 Mbit.

In SW #2 in the next stage, since it originally has a queue length of 1 Mbit and the amount of data to be buffered in the queue is also 1 Mbit, there is no change. As a result, the amount of accumulated data of SW #2 is (Input 2 Gbps−Output 1 Gbps)×Burst Length 1 ms=1 Mbit.

In this way, a buffer memory resource of 4 Mbit which is required for leveling the microburst is secured on the transfer path.

A communication control device (L2NW controller: L2NWC) is arranged on the L2NW to determine the resource adjustment value. The L2NWC sequentially acquires the amount of discarded data for each flow ID from each SW, determines adjustment values for the queue length and shaping rate each time data is discarded, and notifies each SW to change them.

CITATION LIST

Non Patent Literature

[NPL 1] Anzai et al., "Development of 10 Gbits/s Traffic Shaper", Anritsu Technical, No. 88, 2013.3
[NPL 2] Uzawa et al., "5G/IOT Jidai No Multi-service Shuuyou Raiya 2 (Layer-2 Network Control Techniques for Multi-service Accommodation toward 5G/IoT era)", IEICE Technical Report, CS2018-47

SUMMARY OF THE INVENTION

Technical Problem

The resource adjustment disclosed in NPL 2 requires that the L2NWC periodically collects the amounts of discarded data for each flow ID from each SW. It is difficult to make this collection cycle less than the total value of the round-trip propagation delay between the L2NWC and each SW, the transfer delay between the L2NWC and each SW, the internal processing delay of each SW, and the internal processing delay of the L2NWC, and the total value may be several tens of milliseconds to a few seconds. Therefore, there is a possibility that a plurality of microbursts may occur in the same flow within one cycle. In that case, the amount of discarded data is the integrated value of the amounts of discarded data generated for the respective microbursts. Therefore, if the adjustment values for the queue length and shaping rate of the SW are determined based on the integrated value of the amounts of discarded data, then the resources may be over allocated.

The present invention is to provide a communication control system, a communication control method, a communication control device, and a communication control program which are capable of preventing resources from being over allocated and efficiently leveling microbursts even in a case where the interval of collecting the amount of discarded data for each flow ID from each SW is long.

Means for Solving the Problem

According to a first invention, a communication control system includes a plurality of layer 2 switches (SWs); and a communication control device that controls communication of the SWs, wherein each SW includes one or more queues that each have a variable queue length for accumulating input frames; and a transmission unit that has a shaping function of transmitting the frames accumulated in the queues to a desired destination at a desired rate, and the communication control device includes a correction processing unit that acquires an amount of discarded data generated in each queue of the SW, and multiplies the acquired amount of discarded data by a correction coefficient weighted by the cumulative number of times of discarding occurrences for which the amount of discarded data is not 0 to obtain a corrected amount of discarded data; and an adjustment processing unit that determines adjustment values for the queue length of each queue and shaping rate of the SW based on the corrected amount of discarded data, and notifies each SW of the adjustment values.

In the communication control system according to the first invention, the correction coefficient may be managed for each SW and for each queue, and may be a value with an upper limit of 1 that increases by $\beta$ ($\beta$<1) each time the cumulative number of times of discarding occurrences increases. Further, the correction coefficient may be $\alpha$ smaller than $\beta$ when the cumulative number of times of discarding occurrences is 1.

In the communication control system according to the first invention, the correction coefficient may be managed for each SW and for each queue, and may be a value with an upper limit of 1 that increases by $\beta$d according to the cumulative number of times of discarding occurrences d, and $\beta 1 < \beta 2 < \ldots < \beta(N-1) < \beta N$ or $\beta 1 > \beta 2 > \ldots > \beta(N-1) > \beta N$ may be set, where N is the cumulative number of times of discarding occurrences when the correction coefficient reaches 1.

In the communication control system according to the first invention, the correction processing unit may perform processing of stopping incrementing the cumulative number of times of discarding occurrences when the amount of discarded data becomes 0, and of decrementing the cumulative number of times of discarding occurrences when the cumulative number of times of not-discarding occurrences in which the amount of discarded data is 0 exceeds a specified value, after the cumulative number of times of discarding occurrences reaches 1 or more.

In the communication control system according to the first invention, the correction processing unit may set as an initial value a correction coefficient based on an immediately preceding correction coefficient when the amount of discarded data becomes 0, and obtain a correction coefficient weighted by the cumulative number of times of discarding occurrences reset, after the cumulative number of times of discarding occurrences reaches 1 or more.

According to a second invention, a communication control method performed by a communication control system that includes a plurality of layer 2 switches (SWs), and a communication control device that controls communication of the SWs, each SW including one or more queues that each have a variable queue length for accumulating input frames, and a transmission unit that has a shaping function of transmitting the frames accumulated in the queues to a desired destination at a desired rate, the communication control method including: by the communication control device, acquiring an amount of discarded data generated in each queue of the SW; multiplying the acquired amount of discarded data by a correction coefficient weighted by the cumulative number of times of discarding occurrences for which the amount of discarded data is not 0 to obtain a corrected amount of discarded data; determining adjustment values for the queue length of each queue and shaping rate of the SW based on the corrected amount of discarded data; and notifying each SW of the adjustment values.

According to a third invention, a communication control device for a communication control system that includes a plurality of layer 2 switches (SWs), and the communication control device that controls communication of the SWs, each SW including one or more queues that each have a variable queue length for accumulating input frames, and a transmission unit that has a shaping function of transmitting the frames accumulated in the queues to a desired destination at a desired rate, the communication control device being configured to acquire an amount of discarded data generated in each queue of the SW; multiply the acquired amount of discarded data by a correction coefficient weighted by the cumulative number of times of discarding occurrences for which the amount of discarded data is not 0 to obtain a corrected amount of discarded data; determine adjustment values for the queue length of each queue and shaping rate of the SW based on the corrected amount of discarded data; and notify each SW of the adjustment values.

A communication control program according to a fourth invention causes a computer to execute processing performed by the communication control device according to the third invention to acquire an amount of discarded data generated in each queue of the SW; multiply the acquired amount of discarded data by a correction coefficient weighted by the cumulative number of times of discarding occurrences for which the amount of discarded data is not 0 to obtain a corrected amount of discarded data; and determine adjustment values for the queue length of each queue and shaping rate of the SW based on the corrected amount of discarded data.

Effects of the Invention

According to the present invention, it is possible to prevent resources for the queue length and shaping rate of the SWs from being over allocated and efficiently level microbursts even in a case where the interval of collecting the amount of discarded data for each flow ID from each SW is long.

DESCRIPTION OF EMBODIMENTS

A feature of the present invention is to correct the amount of discarded data collected for each flow from each SW of an L2NW by a method described below, and determine adjustment values for the queue length and shaping rate of each SW based on the amount of discarded data after correction (corrected amount of discarded data). The present invention is different from that of NPL 2 in this feature.

Figure 1:
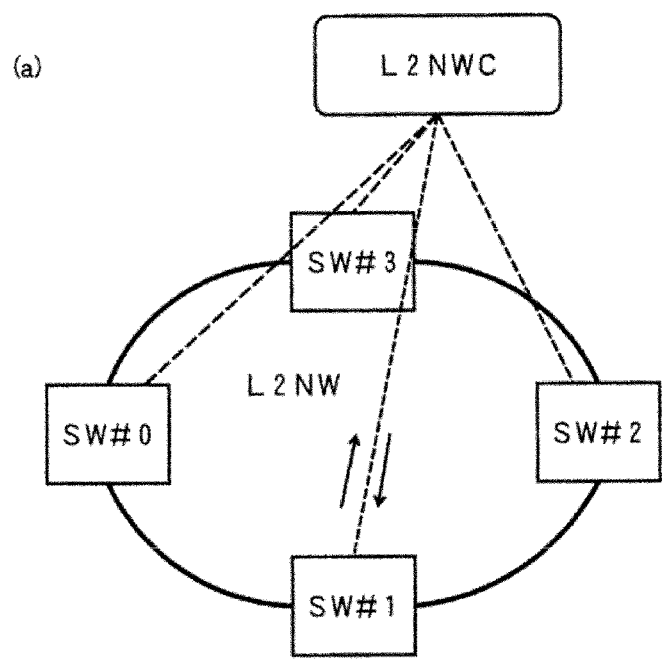
FIG. 1 is a diagram illustrating a configuration example of a communication control system according to the present invention.
Figure 1:
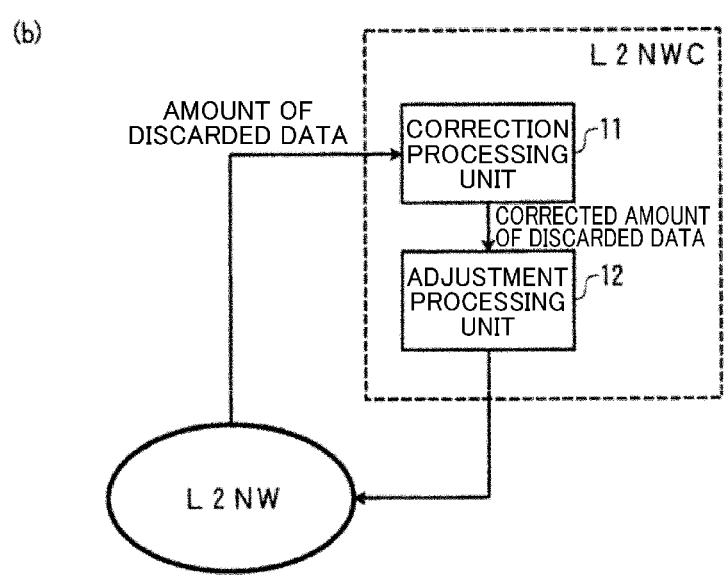

FIG. 1 illustrates a configuration example of a communication control system according to the present invention.

In FIG. 1, an L2NWC is connected to SW #0 to SW #3 which make up an L2NW. Each SW in the L2NW includes the same number of queues as the number of flow IDs, and accumulates transfer frames for each flow ID. Each SW also includes a transmission unit having a shaping function for leveling the accumulated frames to a designated shaping rate for each flow ID and outputting the resulting frames.

The L2NWC includes a correction processing unit 11 that outputs a corrected amount of discarded data obtained by correcting the amount of discarded data collected for each flow ID from each SW, and an adjustment processing unit 12 that determines adjustment values for the queue length and shaping rate of each SW for each flow ID based on the corrected amount of discarded data.

The correction processing unit 11 updates a correction coefficient $C(f, n)$ each time an amount of discarded data is collected, where f is a flow ID and n is the number of an SW, and then the correction processing unit 11 outputs a corrected amount of discarded data obtained by multiplying the amount of discarded data collected for each flow ID from each SW by the updated correction coefficient $C(f, n)$. Note that the correction coefficient $C(f, n)$ is a different value for each SW and each flow ID.

The adjustment processing unit 12 treats the corrected amount of discarded data output by the correction processing unit 11 for each SW and each flow ID as the amount of discarded data collected from each SW, determines the adjustment values for the queue length and shaping rate of each SW for each flow ID in the same manner as in NPL 2, and notifies each SW of the adjustment values.

First Embodiment

Figure 2:
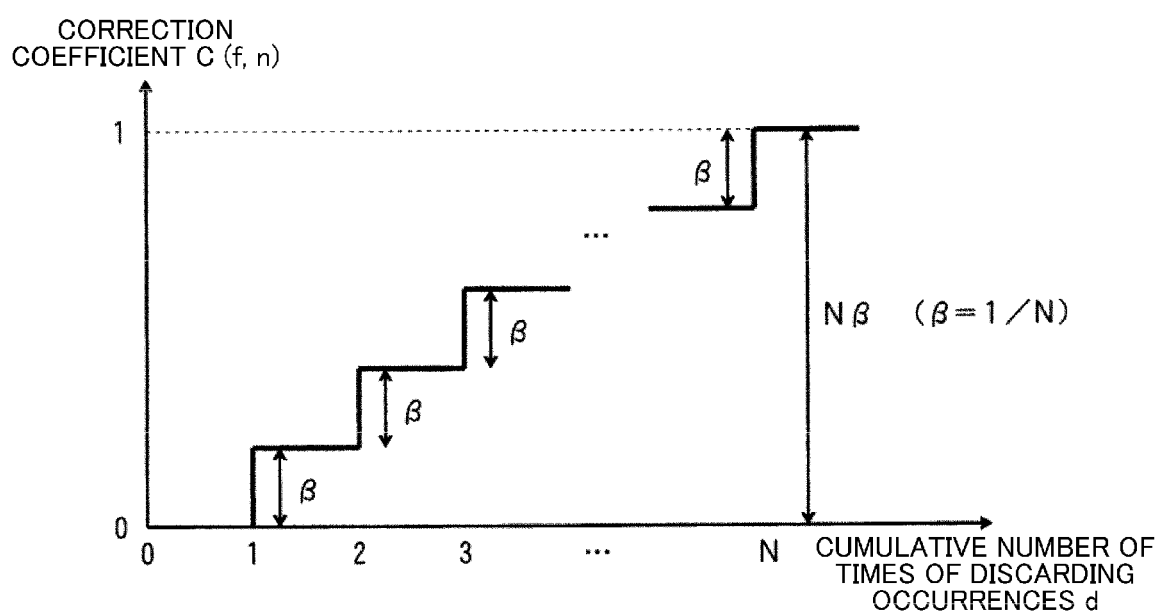
FIG. 2 is a diagram illustrating an outline of updating a correction coefficient $C(f, n)$ in a first embodiment.

FIG. 2 illustrates an outline of updating the correction coefficient $C(f, n)$ in a first embodiment.

In FIG. 2, the horizontal axis represents the cumulative number of times of discarding occurrences d, which is the cumulative number of times the amount of discarded data collected for the flow ID: f from SW #n was not 0. The vertical axis is the correction coefficient $C(f, n)$ collected for the flow ID: f from SW #n, where the correction coefficient is β for a cumulative number of times of discarding occurrences d of 1 and increases by 3 each time the cumulative number of times of discarding occurrences d increases by 1, and its upper limit is 1. Accordingly, the correction coefficient $C(f, n)$ is given by the following equation.

$$C(f,n)=\min(1, d \times \beta)$$

Here, β is a predetermined value, and for example, in a case where the cumulative number of times of discarding occurrences when the correction coefficient $C(f, n)$ reaches the upper limit of 1 is set to N, it is represented as $$\beta=1/N.$$

As illustrated in FIG. 2, the correction coefficient $C(f, n)$ is weighted according to the cumulative number of times of discarding occurrences d. In other words, the correction coefficient $C(f, n)$ at the early stage for the cumulative number of times of discarding occurrences d is significantly smaller than 1, and the corrected amount of discarded data obtained by multiplying the amount of collected discarded data by the correction coefficient $C(f, n)$ is also small. This makes it possible to avoid over-allocation to respective SWs based on the amount of discarded data before correction. Further, as the cumulative number of times of discarding occurrences d increases, the correction coefficient $C(f, n)$ increases, and the corrected amount of discarded data also increases. As a result, the corrected amount of discarded data approaches the amount of discarded data before correction, so that the occurrence of data discarding can be suppressed by appropriately adjusting the resources for the SWs. Further, it is possible not only to prevent a situation in which a large number of allocation changes (changes in the queue length and shaping rate) occur in the adjustment processing unit 12 despite traffic conditions similar to those of microbursts that have occurred in the past, but also to prevent a situation in which an excessive allocation change is made to a microburst under a traffic condition that has never occurred in the past.

Here, when the correction coefficient C(f, n), which increases according to the cumulative number of times of discarding occurrences d, exceeds 1, the cumulative number of times of discarding occurrences d is reset to 0. Further, the corrected amount of discarded data obtained by multiplying the correction coefficient C(f, n) is suppressed to be equal to or less than the maximum amount of discarded data that can occur in one microburst.

Second Embodiment

Figure 3:
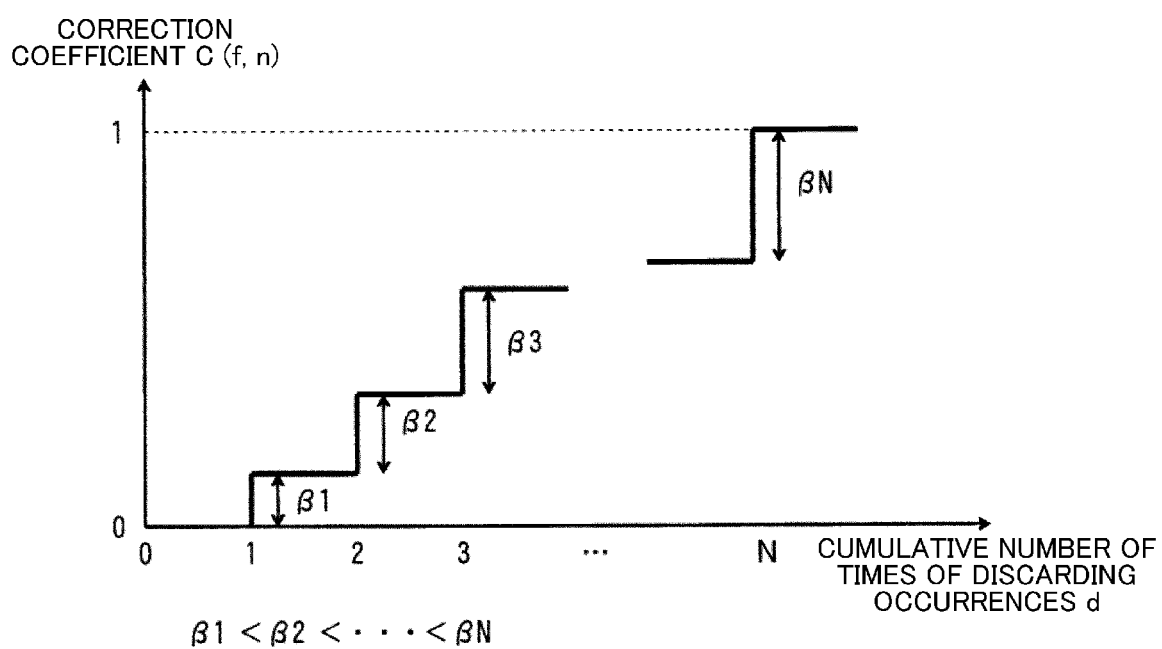
FIG. 3 is a diagram illustrating an outline of updating a correction coefficient $C(f, n)$ in a second embodiment.

FIG. 3 illustrates an outline of updating the correction coefficient C(f, n) in a second embodiment.

In FIG. 3, the horizontal axis represents the cumulative number of times of discarding occurrences d. The vertical axis is the correction coefficient C(f, n) collected for the flow ID: f from SW #n, and the correction coefficient increases by βd according to the cumulative number of times of discarding occurrences d. Accordingly, the correction coefficient C(f, n) is set as $$\beta 1, \beta 2, \ldots, \beta(N-1), \beta N$$

according to the cumulative number of times of discarding occurrences d. Here, N is the cumulative number of times of discarding occurrences when the correction coefficient C(f, n) reaches 1, and $$\beta 1 < \beta 2 < \ldots < \beta(N-1) < \beta N$$

may be set so that the rate of increase in the correction coefficient C(f, n) increases as the cumulative number of times of discarding occurrences d increases. Or $$\beta 1 > \beta 2 > \ldots > \beta(N-1) > \beta N$$

may be set so that the rate of increase in the correction coefficient C(f, n) decreases as the cumulative number of times of discarding occurrences d increases.

Third Embodiment

Figure 4:
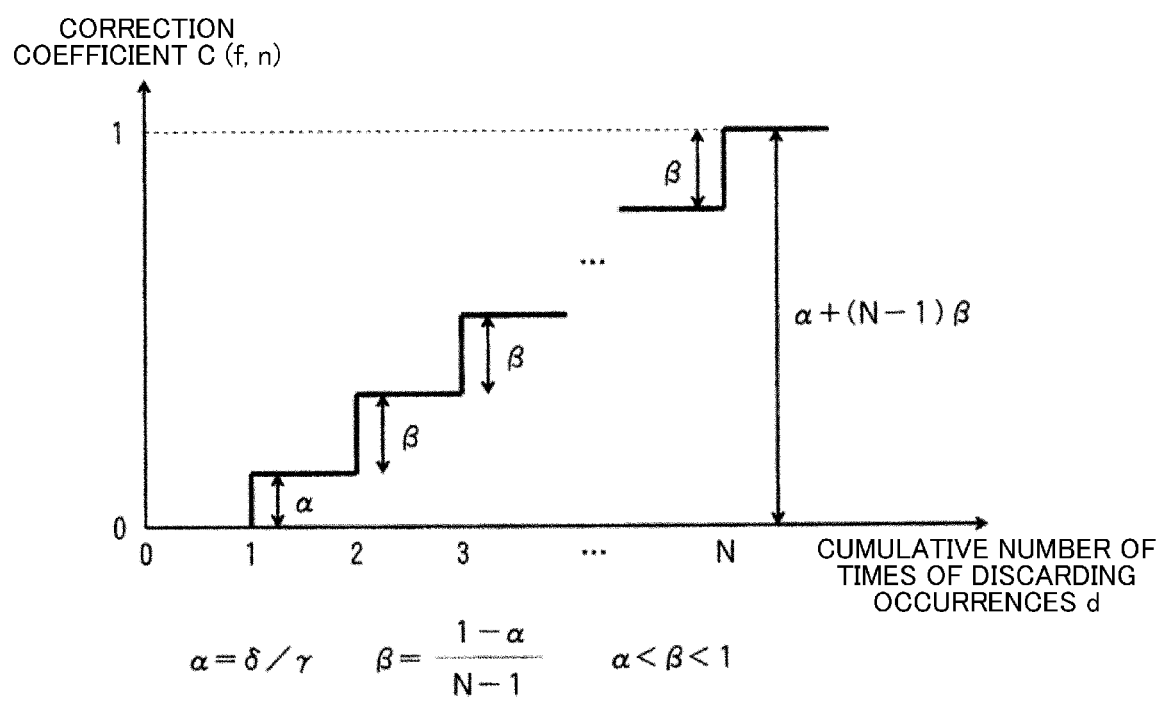
FIG. 4 is a diagram illustrating an outline of updating a correction coefficient $C(f, n)$ in a third embodiment.

FIG. 4 illustrates an outline of updating the correction coefficient C(f, n) in a third embodiment.

In FIG. 4, the horizontal axis represents the cumulative number of times of discarding occurrences d. The vertical axis is the correction coefficient C(f, n) collected for the flow ID: f from SW #n, where the correction coefficient is α for a cumulative number of times of discarding occurrences d of 1 and increases by β each time the cumulative number of times of discarding occurrences d increases by 1. Accordingly, the correction coefficient C(f, n) is given by the following equation.

$$d=1: C(f,n)=\alpha$$

$$d \geq 2: C(f,n) = \min(1, \alpha + d \times \beta)$$

Here, α and β are both predetermined values, and for example, are represented as $$\alpha = \delta/\gamma$$

$$\beta = (1-\alpha)/(N-1)$$

where γ [s] is a collection time interval of the amount of discarded data, δ [s] is an average length of microbursts, and N is the cumulative number of times of discarding occurrences when the correction coefficient C(f, n) reaches the upper limit of 1. In addition, α<β<1 may be set.

Further, the value to be added to the correction coefficient C(f, n) each time the cumulative number of times of discarding occurrences d increases is not limited to the fixed value β, and may be, for example, β2 to βN that gradually increase as in the second embodiment. Further, the correction coefficient C(f, n) may be α for a cumulative number of discarding occurrences d of 1, and may be d×β for a cumulative number of discarding occurrences d of 2 or more.

Fourth Embodiment

In the first to third embodiments, when the amount of discarded data collected for each flow ID from each SW reaches 0, incrementing the cumulative number of times of discarding occurrences d is stopped, and the cumulative number of times of discarding occurrences d is reset to 0 when the correction coefficient C(f, n) exceeds 1.

In a fourth embodiment, the number of times the amount of collected discarded data becomes 0 continuously is incremented, and when the cumulative number of that times (the cumulative number of not-discarding occurrences) exceeds M, the cumulative number of times of discarding occurrences d is decremented, and then the correction coefficient C(f, n) corresponding to the cumulative number of times of discarding occurrences d is updated. This makes it possible to prevent a situation in which a traffic condition in which discarded data no longer occurs with time is continuously taken into consideration.

Fifth Embodiment

Figure 5:
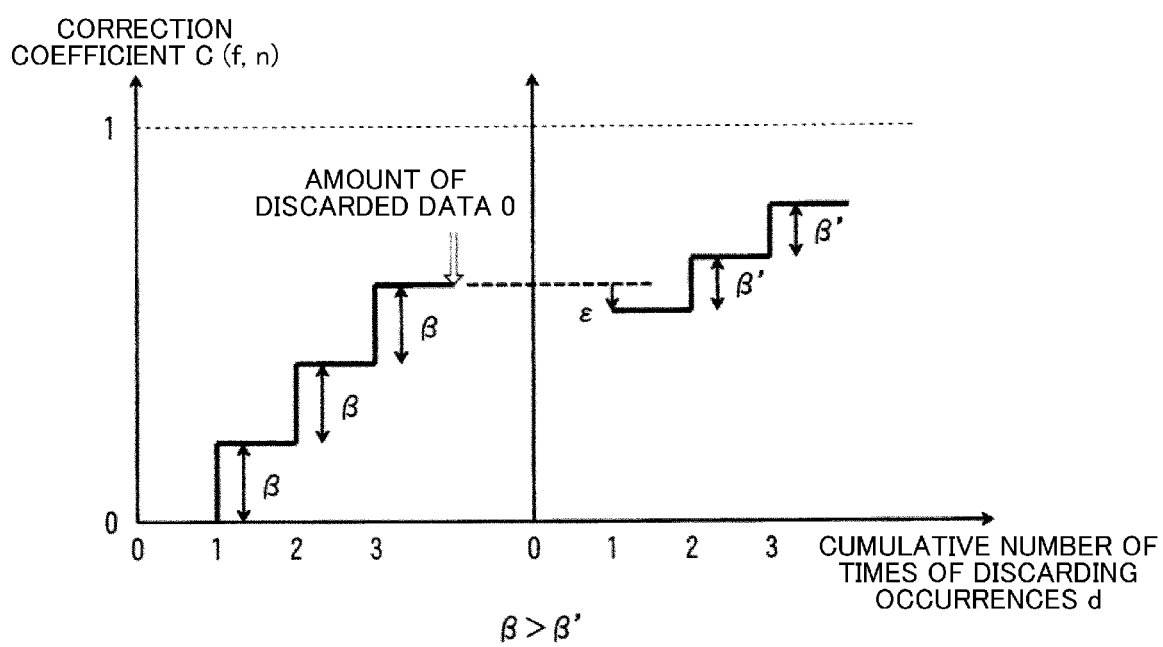
FIG. 5 is a diagram illustrating an outline of updating a correction coefficient $C(f, n)$ in a fifth embodiment.
Figure 6:
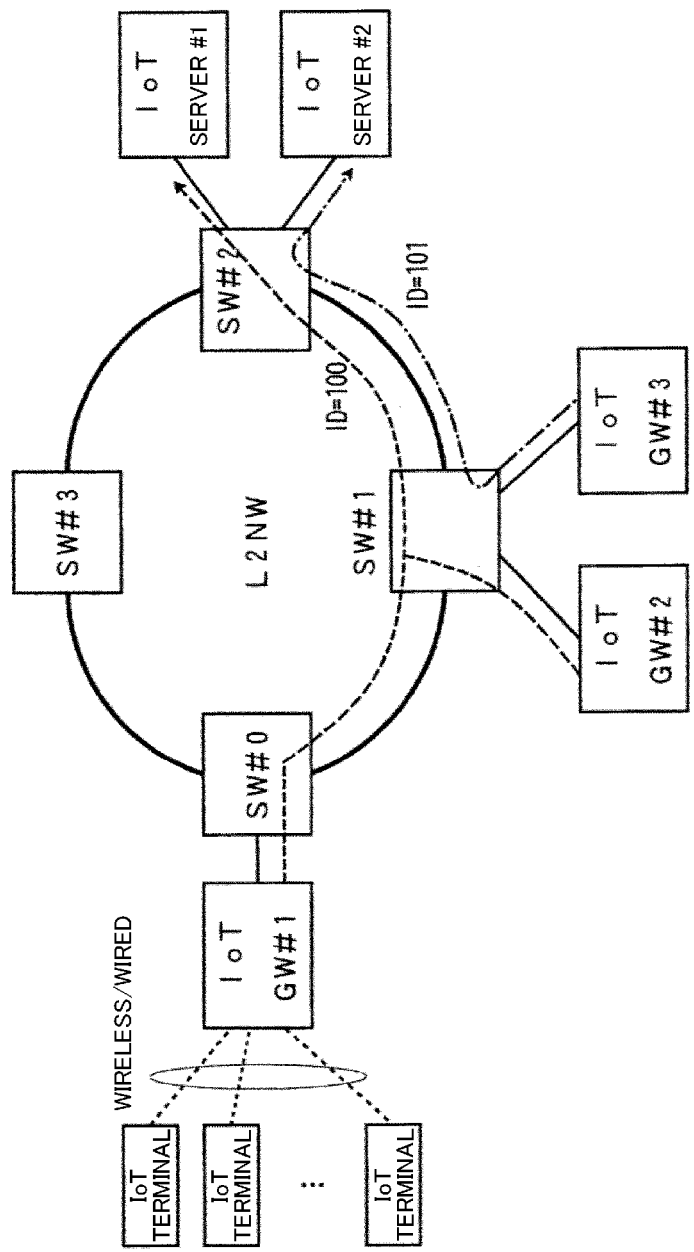
FIG. 6 is a diagram illustrating a configuration example of a conventional communication control system.
Figure 7:
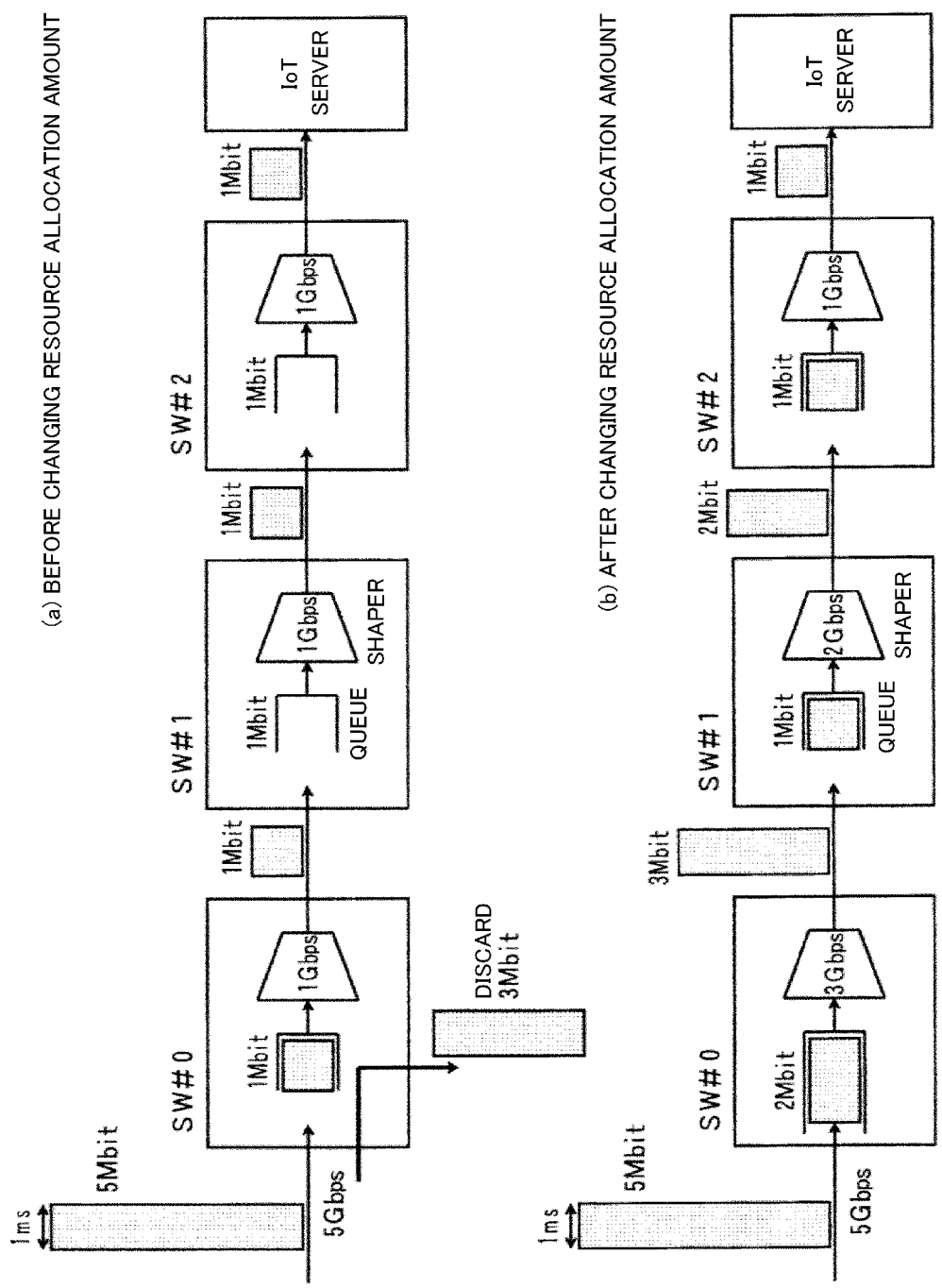
FIG. 7 illustrates an example of changing the resource allocation amount disclosed in NPL 2.

FIG. 5 illustrates an outline of updating the correction coefficient C(f, n) in a fifth embodiment.

In FIG. 5, in the fifth embodiment, basically as in the first embodiment, the correction coefficient C(f, n) increases by β according to the cumulative number of times of discarding occurrences d, but the cumulative number of times of discarding occurrences d is reset to 0 when the amount of collected discarded data reaches 0. In addition, a value obtained by subtracting a predetermined value ε from the correction coefficient C(f, n) at that time is set as an initial value, and a step width for the correction coefficient C(f, n) that increases according to the cumulative number of times of discarding occurrences d is set to β' which is smaller than β. Hereinafter, the above processing is repeated each time the amount of collected discarded data reaches 0.

Here, the determination as to whether or not the amount of discarded data reaches 0 is when the amount of discarded data indicates 0 continuously for a predetermined period. The predetermined period is, for example, a value obtained by adding a predetermined value V to an average of periods for which no data discarding occurs.

OTHER EMBODIMENTS

Although the embodiments of the present invention have been described above, the present invention is not limited to the above-described embodiments, and can be implemented by any combination of the embodiments without being inconsistent.

Further, the SWs and L2NWC making up the L2NW in each embodiment may each be provided as a general-purpose computer. In that case, a program for implementing their functions may be recorded on a computer-readable recording medium, and the program recorded on the recording medium may be read and executed by a computer system. Note that the term "computer system" as used herein includes an OS and hardware such as a peripheral devices. Further, the "computer-readable recording medium" refers to a portable medium such as a flexible disk, a magneto-optical disk, a ROM, or a CD-ROM, or a storage device such as a hard disk built in the computer system. Further, a "computer-readable recording medium" may include anything that dynamically holds the program for a short period of time, for example, a communication line for transmitting a program via a network such as the Internet or a telecommunication line such as a telephone line, and anything that holds the program for a certain period of time, such as a volatile memory included in the computer system that serves as a server or a client in that case. Further, the above program may be for implementing a part of the above-mentioned functions, may be further provided as any combination of a program already recorded in the computer system for implementing the above-mentioned functions, or may be implemented by using hardware such as PLD (Programmable Logic Device) or FPGA (Field Programmable Gate Array).

REFERENCE SIGNS LIST

11 Correction processing unit
12 Adjustment processing unit

The invention claimed is:

1. A communication control system comprising: a plurality of layer 2 switches (hereinafter, referred to as SWs); and a communication control device that controls communication of the SWs, wherein each SW includes: one or more queues that each have a variable queue length for accumulating input frames; and a transmission unit that has a shaping function of transmitting the frames accumulated in the queues to a desired destination at a desired rate, and the communication control device includes: a correction processing unit that acquires an amount of discarded data generated in each queue of the SW, and multiplies the acquired amount of discarded data by a correction coefficient weighted by the cumulative number of times of discarding occurrences for which the amount of discarded data is not 0 to obtain a corrected amount of discarded data; and an adjustment processing unit that determines adjustment values for the queue length of each queue and shaping rate of the SW based on the corrected amount of discarded data, and notifies each SW of the adjustment values.

2. The communication control system according to claim 1, wherein the correction coefficient is managed for each SW and for each queue, and is a value with an upper limit of 1 that increases by $\beta$ ($\beta<1$) each time the cumulative number of times of discarding occurrences increases.

3. The communication control system according to claim 2, wherein the correction coefficient is $\alpha$ smaller than the $\beta$ when the cumulative number of times of discarding occurrences is 1.

4. The communication control system according to claim 1, wherein
the correction coefficient is managed for each SW and for each queue, and is a value with an upper limit of 1 that increases by $\beta d$ according to the cumulative number of times of discarding occurrences d, and $$\beta 1<\beta 2<\ldots <\beta(N-1)<\beta N \text{ or } \beta 1>\beta 2>\ldots >\beta(N-1)>\beta N$$

is set, where N is the cumulative number of times of discarding occurrences when the correction coefficient reaches 1.

5. The communication control system according to claim 1, wherein the correction processing unit performs processing of stopping incrementing the cumulative number of times of discarding occurrences when the amount of discarded data becomes 0, and of decrementing the cumulative number of times of discarding occurrences when the cumulative number of times of not-discarding occurrences in which the amount of discarded data is 0 exceeds a specified value, after the cumulative number of times of discarding occurrences reaches 1 or more.

6. The communication control system according to claim 1, wherein the correction processing unit sets as an initial value a correction coefficient based on an immediately preceding correction coefficient when the amount of discarded data becomes 0, and obtains a correction coefficient weighted by the cumulative number of times of discarding occurrences reset, after the cumulative number of times of discarding occurrences reaches 1 or more.

7. A communication control method performed by a communication control system including a plurality of layer 2 switches (hereinafter, referred to as SWs) and a communication control device that controls communication of the SWs, each SW including one or more queues that each have a variable queue length for accumulating input frames, and a transmission unit that has a shaping function of transmitting the frames accumulated in the queues to a desired destination at a desired rate, the communication control method comprising: by the communication control device, acquiring an amount of discarded data generated in each queue of the SW; multiplying the acquired amount of discarded data by a correction coefficient weighted by the cumulative number of times of discarding occurrences for which the amount of discarded data is not 0 to obtain a corrected amount of discarded data; determining adjustment values for the queue length of each queue and shaping rate of the SW based on the corrected amount of discarded data; and notifying each SW of the adjustment values.

8. A communication control device for a communication control system that includes a plurality of layer 2 switches (hereinafter, referred to as SWs), and the communication control device that controls communication of the SWs, each SW including one or more queues that each have a variable queue length for accumulating input frames, and a transmission unit that has a shaping function of transmitting the frames accumulated in the queues to a desired destination at a desired rate, the communication control device being configured to acquire an amount of discarded data generated in each queue of the SW; multiply the acquired amount of discarded data by a correction coefficient weighted by the cumulative number of times of discarding occurrences for which the amount of discarded data is not 0 to obtain a corrected amount of discarded data; determine adjustment values for the queue length of each queue and shaping rate of the SW based on the corrected amount of discarded data; and notify each SW of the adjustment values.

* * * * *